United States Patent

Kawase

[11] 4,176,937
[45] Dec. 4, 1979

[54] FINDER SYSTEM FOR PHOTOGRAPHING APPARATUS

[75] Inventor: Suminosuke Kawase, Ohmiya, Japan

[73] Assignee: Tokyo Kogaku Kikai Kabushiki Kaisha, Tokyo, Japan

[21] Appl. No.: 877,674

[22] Filed: Feb. 14, 1978

[30] Foreign Application Priority Data

Feb. 18, 1977 [JP] Japan ............................ 52-1889577[U]
Feb. 21, 1977 [JP] Japan ............................ 52-1851377
Feb. 21, 1977 [JP] Japan ............................ 52-1851477

[51] Int. Cl.² .................................................. G03B 29/00
[52] U.S. Cl. .......................................... 354/62; 351/7; 354/109; 354/155; 354/225
[58] Field of Search .................. 354/62, 79, 65, 219, 354/224, 225, 63, 160, 150, 155, 109; 351/7, 14, 15; 350/181, 19

[56] References Cited

U.S. PATENT DOCUMENTS

| | | | |
|---|---|---|---|
| 2,177,737 | 10/1939 | Mohr et al. ........................ | 350/181 X |
| 2,354,614 | 7/1944 | Reason ............................... | 350/181 X |
| 3,623,415 | 11/1971 | Atzmuller ......................... | 354/189 X |
| 3,655,260 | 4/1972 | Bartucci et al. .................. | 350/181 X |
| 3,760,704 | 9/1973 | Baker ................................. | 354/155 |
| 3,912,359 | 10/1975 | Uetake et al. ..................... | 350/181 X |

Primary Examiner—John Gonzales
Attorney, Agent, or Firm—Stevens, Davis, Miller & Mosher

[57] ABSTRACT

Photographing apparatus comprising a photographing optical axis which is inclined with respect to a photographing film plane. The apparatus is provided with a finder system having an optical axis divided out from the photographing optical axis and including a relay lens and an eye lens. The relay lens is disposed with the major plane thereof with respect to the optical axis of the finder system in such a manner that the major plane intersects a plane containing a first image in the finder system in a plane which is perpendicular to the optical axis of the eye lens and passing through a position wherein a second image is produced.

4 Claims, 5 Drawing Figures

FINDER SYSTEM FOR PHOTOGRAPHING APPARATUS

The present invention relates to photographing apparatus and more particularly to photographing apparatus having an optical axis which is not perpendicular to a photographing film plane. More specifically, the present invention pertains to a finder system for such photographing apparatus.

When it is desired to take photographs of an object at an angle with respect to a surface thereof, it is possible to have an object image focused on a film plane throughout the object surface by arranging the photographing film plane at an angle with respect to the photographing optical axis in such a way that the major plane of the photographing lens contains a line of intersection between the film plane and a plane containing the object plane. In this type of photographing apparatus, an object image will be produced at an angle with respect to the optical axis in a finder system where such finder system is so provided that it has an optical system divided out from the photographing optical system. Therefore, it is impossible to obtain an object image of adequate intensity due to loss of power in an arrangement where a focusing plate is located along the inclined image plane.

Thus, the present invention has an object to provide a finder system for a photographing apparatus having a film plane inclined with respect to a film plane.

It is another object of the present invention to provide a finder system for a photographing system of the aforementioned type which makes it possible to observe an object image through an eye lens.

According to the present invention, in order to accomplish the above and other objects, there is provided a finder system for a photographing apparatus including a photographing optical axis and a photographing film plane which is inclined from a right angle with respect to the photographing optical axis, said finder system comprising relay lens means, eye lens means having an optical axis and means for reflecting light through the photographing optical axis toward the relay lens means, said relay lens means having a major plane inclined with respect to an optical axis of the eye lens means in such a way that the major plane intersects a plane containing a first image in said finder system in a plane which is perpendicular to the optical axis of the eye lens means and passing through a position wherein a second image is produced. According to the arrangement of the present invention, the second image is produced in the finder system perpendicularly with respect to the optical axis of the eye lens means so that the image can be observed through the eye lens means without using any additional means such as a focusing plate.

The photographing apparatus in accordance with the present invention is particularly suitable for application to an apparatus for taking photographs of crystalline lenses of human eyes. Such apparatus usually includes a slit illumination system for illuminating a human eye in a slit plane and a photographing apparatus is combined with the slit illumination system with the photographing optical axis inclined with respect to the slit plane. In such an apparatus, it is desirable that it can take photographs with respect to various orientations of the slit plane. It is therefore desirable to mount the slit illumination system and the photographing apparatus in such a way that they are rotatable about the slit illumination axis.

The present invention has a further object of providing a finder system suitable for an apparatus including a slit illumination system and a photographing system which are rotatable about a slit illumination axis.

In order to accomplish the aforementioned object, the present invention proposes to arrange the optical axis of the eye lens means in the finder system close to the slit illumination axis so as to minimize the displacement of the eye lens means upon rotation of the apparatus. In a preferable aspect of the present invention, means is further provided for projecting data inherent to the patient on the photographing film plane through reflecting mirror means provided in the finder system.

The above and other objects and features of the present invention will become apparent from the following descriptions of preferred embodiments taking reference to the accompanying drawings, in which.

Figure 1:
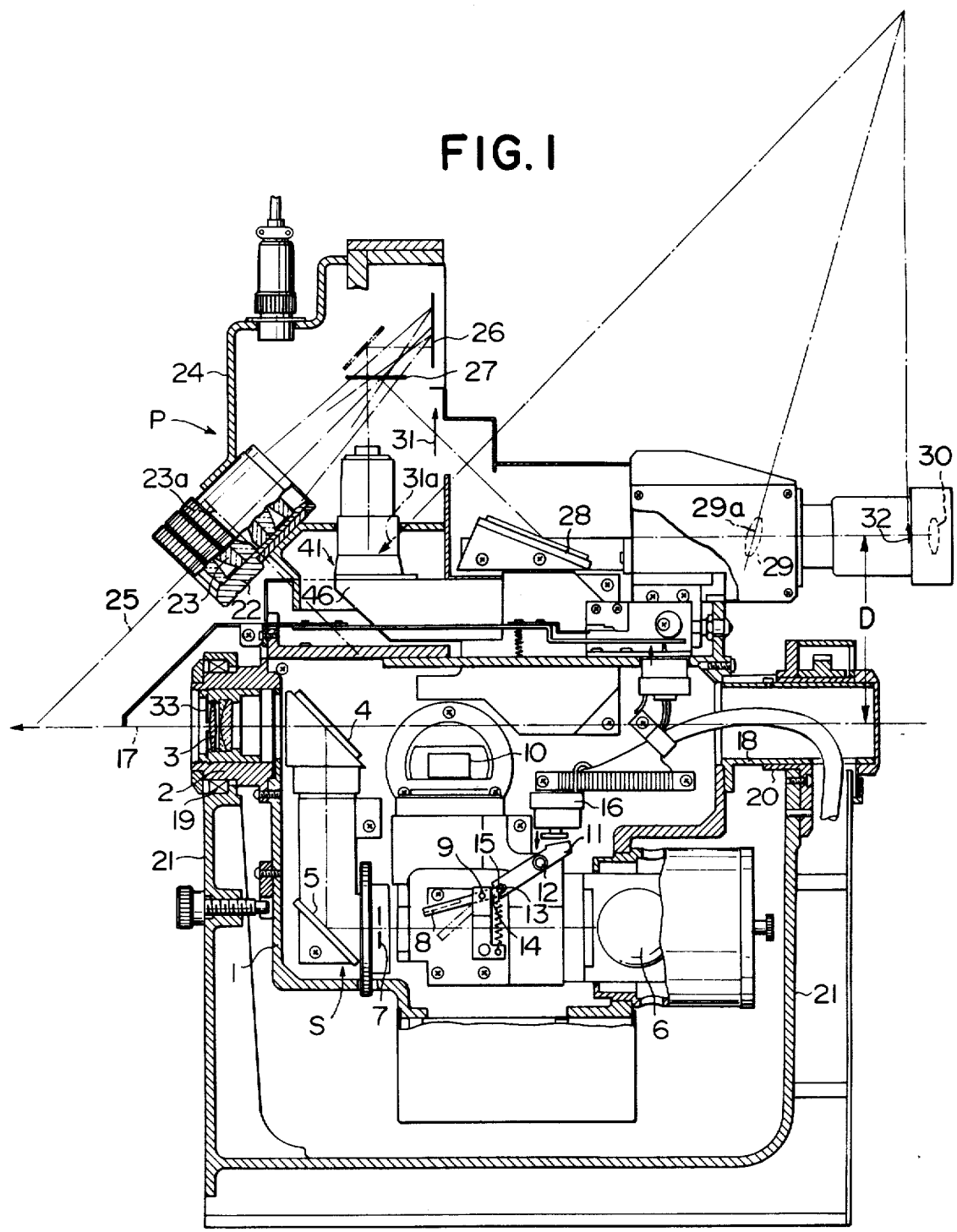
FIG. 1 is a sectional view of an apparatus for taking photographs of crystalline lenses, which embodies the features of the present invention.

Referring now to the drawings, particularly to FIG. 1, the apparatus in accordance with the present invention includes a slit illumination system S and a photographing optical system P which are disposed in a housing 1.

The slit illumination system S comprises a projecting lens 3 mounted in a lens tube 2 which is in turn fixed to the housing 1. Further, the system S includes reflecting mirrors 4 and 5 and an observation light source 6. A slit mask 7 is disposed between the mirror 5 and the light source 6. Between the slit mask 7 and the light source 6, there is disposed a reflecting mirror 8 which is movable about a pin 9 between a retracted position as shown by solid lines and an extended position as shown by dotted lines.

A photographing light source 10 is provided along the reflecting optical axis of the mirror 8 in the extended position. In order to move the mirror between the extended and retracted position, an actuating lever 11 is provided. A second slit aperture plate 33 is disposed in the tube 2 of the projecting lens 3.

The actuating lever 11 is pivotably mounted by means of a shaft 12 and provided at one end with a groove 13 which engages a pin 15 on an extension of a frame 14 for the mirror 8. The other end of the actuating lever 11 is arranged so as to co-operate with a solenoid device 16 which serves when energized to force the corresponding end of the actuating lever 11 in the direction shown by an arrow so that the mirror 8 is moved to the extended or operative position shown by the dotted lines in FIG. 1.

The projecting lens 3 has an optical axis 17 which defines a slit axis and the housing 1 is provided at the rear portion with a shaft 18 of hollow cylindrical configuration. The shaft 18 is coaxial with the slit axis as well as with the lens tube 2 and the housing 1 is mounted at the lens tube 2 and the shaft 18 on a frame 21 by means of bearings 19 and 20. The housing 1 is therefore rotatable about the optical axis of the projecting lens 3 or the slit axis 17 and the plane of the projected slit is also rotatable about the axis. The frame 21 is in turn mounted on a base structure for fore and aft, left and right and up and down movements in order to facilitate adjustment of the apparatus in aligning the visual axis of the patient's eye with the slit axis.

The photographing optical system P includes a photographing lens 23 mounted in a lens tube 22 which is rotatably supported in a camera housing 24 secured to the housing 1. In the illustrated embodiment, the lens 23 has an optical axis 25 which intersects the slit axis 17 at an angle of 45° and a film 26 is located on the photographing optical axis 25 within the camera housing 24. The film 26 is positioned in a plane which intersects the slit plane at a right angle and the photographing lens 23 is arrangeed in such a manner that the major plane 23a thereof intersects the plane of the film 26 at the intersection between the film plane and the slit plane.

The apparatus further includes a finder system which comprises a reflecting mirror 27 disposed between the photographing lens 23 and the film 26. The mirror 27 is movable between an operative or extended position as shown by solid lines and an inoperative or retracted position shown by dotted lines, and such movement of the mirror is effected in response to an actuation of the shutter mechanism in the photographing system.

In the operative position, the mirror 27 functions to reflect the light through the photographing lens 23. On the reflecting axis of the mirror 27, there is provided a second mirror 28 which reflects the light from the mirror 27 rearwardly in the direction parallel with the slit axis 17. Along the reflecting axis of the mirror 28, there are arranged a relay lens 29 and an eye lens 30.

The light which has passed through the photographing lens 23 produces a first image 31 of the crystalline lens of the patient's eye at a section where the slit illumination is effected. The light from the image is reflected by the mirror 28 and passed through the relay lens 29 to produce a second image 32 which is observed through the eye lens 30. For the explanation of the finder system, consideration may be made on an apparent image 31a which is symmetrical with the first image 31 with respect to the reflecting plane of the mirror 28. In accordance with the feature of the present invention, the relay lens 29 has a major plane 29a which passes through the intersection between the plane of the apparent image 31a and the plane of the second image 32. With this arrangement of the finder system, it is possible to focus the image throughout the image plane although the apparent image 31a is slanted with respect to the optical axis and the second image 32 is perpendicular thereto. The finder system is advantageous in that the first image 31 can be observed in the form of a space image and that a brighter image can be produced as compared with an arrangement wherein the first image is produced on an imaging plate.

Further, it should be noted that according to a further feature of the present invention the finder system is so arranged that the optical axis of the eye lens 30 is closely located with respect to the axis of rotation of the housing 1. In other words, the distance D in FIG. 1 is relatively small. This arrangement is advantageous in that the displacement of the optical axis of the eye lens 30 can be minimized upon rotation of the housing 1.

Figure 2:
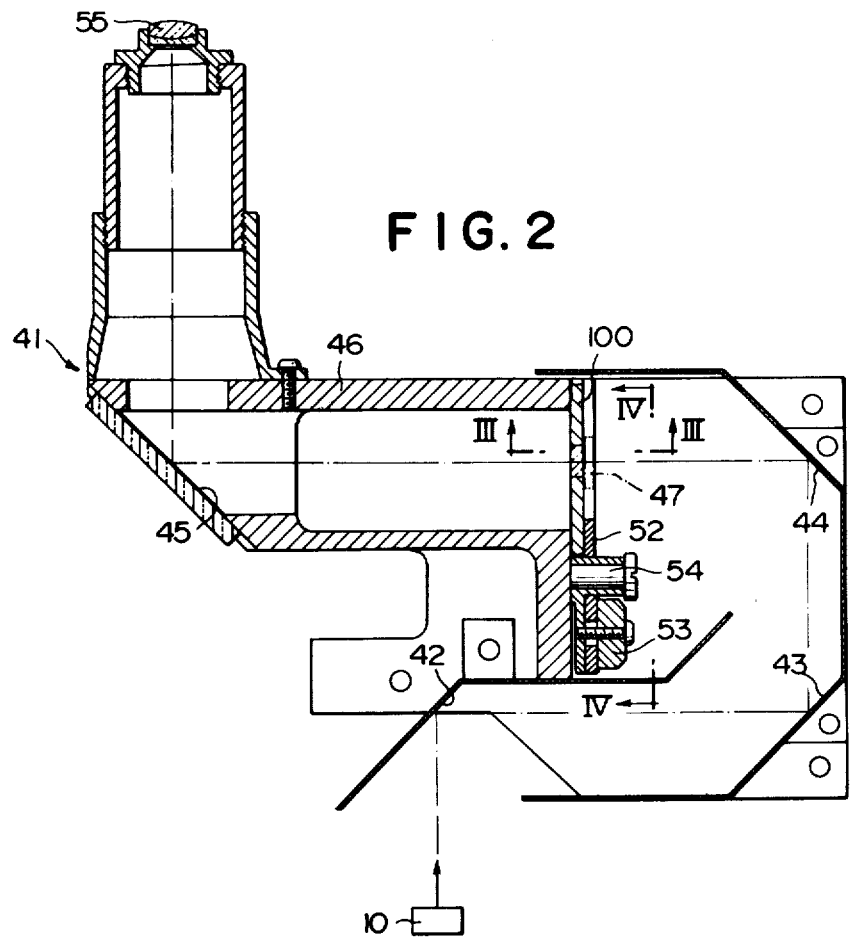
FIG. 2 is a sectional view showing details of the data projecting means.
Figure 3:
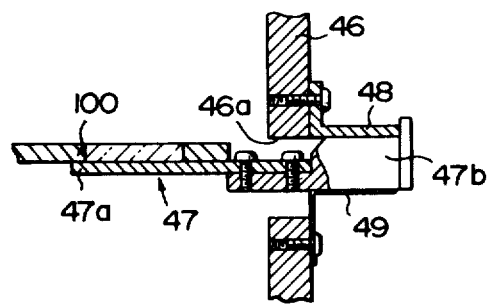
FIG. 3 is a sectional view taken along the line III—III in FIG. 2.
Figure 4:
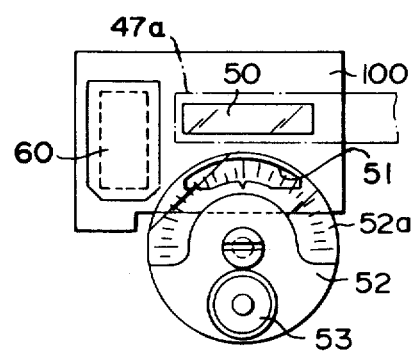
FIG. 4 is a sectional view taken along the line IV—IV in FIG. 2.

The apparatus shown in FIG. 1 includes a data projecting system 41 which comprises, as shown in FIG. 2, a casing 46 containing four reflecting mirrors 42, 43, 44 and 45 for reflecting the light from the photographing light source 10. A data card 47 is adapted to be inserted into the casing 46 between the reflecting mirrors 44 and 45. Referring to FIG. 3, the casing 46 has an opening 46a and a guide flange 48 is provided at one side of the opening 46a. At the other side of the opening 46a, there is provided a depressing spring 49 which co-operates with the flange 48 to define a passage for the date card 47.

In the casing 46, there is provided a plate 100 which has transparent portions 50 and 60 and an angle projecting window 51. The data card 47 is adapted to be positioned in alignment with the transparent portion 50 of the plate 100. The data card 47 comprises a card sheet 47a and a base portion 47b which are secured together by means of screws. The base portion 47b has guide surfaces at the opposite sides thereof for sliding engagement with the flange 48 and the depressing spring 49. The card sheet 47a may have indications of the patient's data, such as the name, right or left eye, and the date on which the photograph is taken. In the particular embodiment, a density scale may be positioned in the transparent portion 60.

In the casing 46, there is disposed an angle plate 52 in such a manner that the upper portion of the plate 52 is aligned with the window 51 of the plate 100. The angle plate 52 is provided at the upper portion with a transparent angular scale 52a and at the lower portion with a weight 53. The plate 52 is rotatably mounted on the casing 46 by means of a pin 54 which is substantially parallel with the slit axis 17. Thus, it will be noted that the plate 52 always maintains the same orientation even when the housing 1 is rotated about the slit axis 17. It is therefore possible to present the angle of rotation of the housing 1 at the window 51 of the plate 100.

The casing 46 further has a projecting lens 55 so that the data on the plate 100 is projected by the light from the source 10 through the projecting lens 55. As shown in FIG. 1 and in accordance with an additional feature of the present invention, the mirror 27 in the finder system serves in its retracted position shown by dotted lines in FIG. 1 to reflect the light from the data projecting system to the film 26. This arrangement is very advantageous in that the data projecting system 41 can be disposed making use of a vacant space in the housing 1 and that it is not required to provide any additional reflecting elements.

Figure 5:
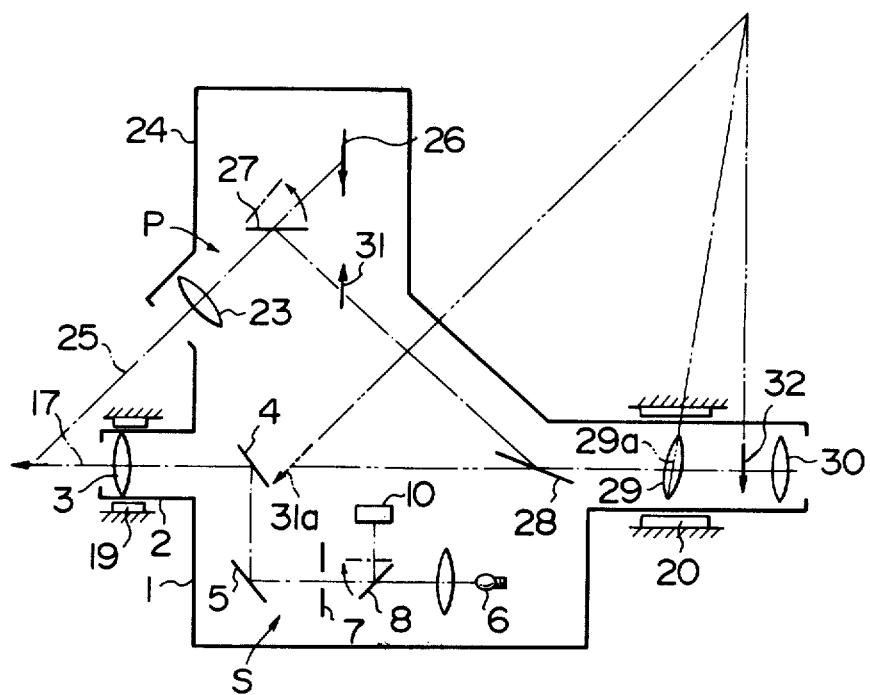
FIG. 5 is a schematic sectional view showing another embodiment of the present invention.

Referring to FIG. 5, the arrangement shown therein is basically identical with that shown in FIG. 1 but it should be noted in this embodiment that the optical axis of the eye lens 30 is axially aligned with the optical axis 17 of the lens 3, that is, the axis of rotation of the housing 1. This arrangement is advantageous in that the axis of the eye lens 30 is not shifted even when the housing 1 is rotated.

It will thus be understood that the objects of the present invention can be accomplished by the arrangements described above. Although the invention has been shown and described with reference to specific embodiments, it should be noted that the invention is in no way limited to the details of the illustrated structures but changes and modifications may be made without departing from the scope of the appended claims.

I claim:

1. In a photographing apparatus including a photographing optical axis and a photographing film plane which is inclined from a right angle with respect to the photographing optical axis, a finder system comprising relay lens means, eye lens means having an optical axis and means for reflecting light through the photographing optical axis toward the relay lens means, said relay lens means having a major plane inclined with respect to an optical axis of the eye lens means in such a way that the major plane intersects a plane containing a first image in said finder system in a plane which is perpendicular to the optical axis of the eye lens means and passing through a position wherein a second image is produced.

2. An apparatus for taking photographs of crystalline lenses including a slit illumination system having a substantially horizontal slit illumination axis for illuminating the crystalline lens along a slit plane, a photographing system including a photographing optical axis and a photographing film plane which is inclined from a right angle with respect to the photographing optical axis, and a finder system comprising relay lens means, eye lens means having an optical axis and means for reflecting light through the photographing optical axis toward the relay lens means, said relay lens means having a major plane inclined with respect to an optical axis of the eye lens means in such a way that the major plane intersects a plane containing a first image in said finder system in a plane which is perpendicular to the optical axis of the eye lens means and passing through a position wherein a second image is produced, said slit illumination system and said photographing system being rotatable as a unit about the slit illumination axis, said optical axis of the eye lens means being located close to the slit illumination axis about which the slit illumination system and the photographing system is rotatable.

3. An apparatus for taking photographs of crystalline lenses including a slit illumination system having a substantially horizontal slit illumination axis for illuminating the crystalline lens along a slit plane, a photographing system including a photographing optical axis and a photographing film plane which is inclined from a right angle with respect to the photographing optical axis, and a finder system comprising relay lens means, eye lens means having an optical axis and means for reflecting light through the photographing optical axis toward the relay lens means, said relay lens means having a major plane inclined with respect to an optical axis of the eye lens means in such a way that the major plane intersects a plane containing a first image in said finder system in a plane which is perpendicular to the optical axis of the eye lens means and passing through a position wherein a second image is produced, said slit illumination system and said photographing system being rotatable as a unit about the slit illumination axis, said optical axis of the eye lens means being located in axial alignment with the slit illumination axis about which the slit illumination system and the photographing system is rotatable.

4. Photographing apparatus in accordance with claim 1 in which said reflecting means including a reflecting mirror disposed for movement between an operative position in which it is positioned in the photographing optical axis to reflect the light toward the relay lens means and an inoperative position in which it is retracted from the photographing optical axis, data projecting means being provided for projecting data onto the film plane through said reflecting mirror in the inoperative position.

* * * * *